United States Patent
Grunnet et al.

(10) Patent No.: US 11,795,911 B2
(45) Date of Patent: Oct. 24, 2023

(54) CONTROL OF SIDE-SIDE AND FORE-AFT VIBRATIONAL MOVEMENT OF A WIND TURBINE

(71) Applicant: VESTAS WIND SYSTEMS A/S, Aarhus N (DK)

(72) Inventors: Jacob Deleuran Grunnet, Tranbjerg J (DK); Fabio Caponetti, Åbyhøj (DK); Poul Brandt Christensen, Ry (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 157 days.

(21) Appl. No.: 17/416,989

(22) PCT Filed: Dec. 16, 2019

(86) PCT No.: PCT/DK2019/050394
§ 371 (c)(1),
(2) Date: Jun. 21, 2021

(87) PCT Pub. No.: WO2020/125891
PCT Pub. Date: Jun. 25, 2020

(65) Prior Publication Data
US 2022/0112879 A1 Apr. 14, 2022

(30) Foreign Application Priority Data
Dec. 18, 2018 (EP) .................... 18213704

(51) Int. Cl.
*F03D 7/02* (2006.01)
*F03D 7/04* (2006.01)

(52) U.S. Cl.
CPC .......... *F03D 7/0296* (2013.01); *F03D 7/045* (2013.01); *F05B 2260/821* (2013.01);
(Continued)

(58) Field of Classification Search
CPC .. F03D 7/0296; F03D 7/045; F05B 2260/821; F05B 2260/84; F05B 2270/331; F05B 2270/334
(Continued)

(56) References Cited

U.S. PATENT DOCUMENTS

| 11,572,865 B2 * | 2/2023 | Vasudevan ............ F03D 7/0224 |
| 2006/0066111 A1 * | 3/2006 | Suryanarayanan ..... F03D 7/042 290/44 |

(Continued)

FOREIGN PATENT DOCUMENTS

| WO | 2018210390 A1 | 11/2018 |
| WO | 2020125891 A1 | 6/2020 |

OTHER PUBLICATIONS

PCT International Search Report for Application No. PCT/DK2019/050394 dated May 3, 2020.
(Continued)

*Primary Examiner* — J. Todd Newton
(74) *Attorney, Agent, or Firm* — Patterson + Sheridan, LLP

(57) ABSTRACT

Aspects of the present invention relate to controlling a wind turbine having a tower damping system actuable to control components of vibrational movement of the tower, a side-side component of a vibrational movement of the tower in a horizontal plane; and a fore-aft component of the vibrational movement of the tower in the horizontal plane are determined; and a control signal based on the side-side and fore-aft components is determined such that the tower damping system produces a force that increases or decreases the vibrational movement of the tower such that the side-side and fore-aft components are substantially equal.

18 Claims, 9 Drawing Sheets

(52) U.S. Cl.
CPC ..... *F05B 2260/84* (2013.01); *F05B 2270/331* (2013.01); *F05B 2270/334* (2013.01)

(58) Field of Classification Search
USPC .......................................................... 416/1
See application file for complete search history.

(56) References Cited

U.S. PATENT DOCUMENTS

| | | | | |
|---|---|---|---|---|
| 2008/0206051 | A1* | 8/2008 | Wakasa | F03D 9/25 416/41 |
| 2010/0187820 | A1* | 7/2010 | Wakasa | F03D 9/25 290/44 |
| 2011/0156393 | A1* | 6/2011 | Wakasa | F03D 7/043 290/44 |
| 2011/0309622 | A1* | 12/2011 | Wakasa | F03D 7/0296 290/44 |
| 2013/0001947 | A1* | 1/2013 | Wakasa | F03D 7/0296 290/44 |
| 2013/0209254 | A1* | 8/2013 | Hess | F03D 7/043 416/1 |
| 2013/0230396 | A1* | 9/2013 | Wakasa | F03D 7/043 416/1 |
| 2013/0236309 | A1* | 9/2013 | Rossetti | B63H 25/42 416/43 |
| 2014/0339827 | A1* | 11/2014 | Esbensen | F03D 7/0204 290/44 |
| 2017/0184077 | A1 | 6/2017 | Caponetti et al. | |
| 2019/0085823 | A1* | 3/2019 | Hovgaard | F03D 17/00 |
| 2019/0277256 | A1* | 9/2019 | Egedal | F03D 7/0272 |

OTHER PUBLICATIONS

Lina Ren et al., "Passivity-based control of tower vibration of offshore wind turbines," 2015 34th Chinese Control Conference (CCC), Technical Committee on Control Theory, Chinese Association of Automation, Jul. 28, 2015 (Jul. 28, 2015), pp. 934-939, XP033201409.

PCT Written Opinion of the International Searching Authority for Application No. PCT/DK2019/050394 dated May 3, 2020.

Extended European Search Report for application 18213704.2-1007 dated Jun. 24, 2019.

* cited by examiner

CONTROL OF SIDE-SIDE AND FORE-AFT VIBRATIONAL MOVEMENT OF A WIND TURBINE

TECHNICAL FIELD

The present disclosure relates to control of side-side and fore-aft vibrational movement of a wind turbine, in particular to dampening of tower vibrational movement towards target vibrational components.

BACKGROUND

Wind turbines as known in the art comprise a tower supporting a nacelle and a rotor with a number of pitch-adjustable rotor blades, Such a configuration is prone to vibrations since it comprises a large mass positioned at the end of a slender tower. These vibrations increase fatigue loads experienced by the tower, which can reduce the operational lifetime of the wind turbine, increase wear on components, and result in sub-optimal power production.

In this regard, a collective adjustment of the blade pitch, where all rotor blades are adjusted by the same pitch angle, can be used to counteract vibrations in the fore-aft direction. This is accomplished by modifying the thrust force. For lateral vibrations, an individual blade pitch adjustment as well as generator torque adjustments may be used to counteract a lateral vibration of the tower. The individual blade pitch adjustment provides individual pitch angle settings for each rotor blade to generate a resulting lateral force, and/or to suppress an existing disturbance from e g. a pitch misalignment. The generator torque adjustment generates a generator torque induced lateral force. Such damping mechanisms are disclosed in the art, e.g. in WO2018/210390 and US2013/209254.

There is still a need in the art to find improved ways of handling the issue of wind turbine tower vibrations, it is an aim of the present invention to address this need.

SUMMARY OF THE INVENTION

According to an aspect of the invention, there is provided a method of controlling a wind turbine comprising a tower, the wind turbine having a tower damping system actuable to control components of vibrational movement of the tower, the method comprising:
  determining a non-zero desired vibrational movement level of the tower in a horizontal plane with a target vibrational component in a side-side direction and a target vibrational component in a fore-aft direction, where the target vibrational component in the side-side direction and the target vibrational component in the side-side direction are substantially equal;
  determining a side-side component of a vibrational movement of the tower in a horizontal plane;
  determining a fore-aft component of the vibrational movement of the tower in the horizontal plane; and
  determining a control signal based on the side-side and fore-aft components for controlling the tower damping system of the wind turbine, the control signal being determined in accordance with the target vibrational component in the side-side direction and the target vibrational component in a fore-aft direction such that the tower damping system produces a force that increases or decreases the vibrational movement of the tower towards the desired vibrational movement level of the tower in the horizontal plane.

Generating the control signal in this way is particularly beneficial as substantially equalized side-side and fore-aft components are useful in reducing tower wear and/or permitting new towers to be built more cheaply and with less material. Substantially equal side-side and fore-aft components are also particularly useful for improving power generation and/or reducing wear on parts of the wind turbine other than the tower.

By making the side-side and fore-aft components substantially equal, the vibrational movement of the turbine in all directions may become substantially equally distributed over time to create a circularized load distribution as the nacelle moves to account for a change in wind direction. Circularizing loads is a straightforward and effective strategy for controlling loading of a turbine tower.

The vibrational movement level of the tower is a non-zero desired vibrational movement level in a horizontal plane with a target vibrational component in a side-side direction and a target vibrational component in a fore-aft direction. The target level may be set in dependency upon which signal type that is used for the vibrational movement. Such signal may reflect tower movement in terms of tower top position, tower top velocity, tower top acceleration. However also load or wear signals may be used, such as strain gauge signals. Non-zero is understood as a desired movement level larger than the noise limit of the chosen signal type, and the specific magnitude may vary in dependency on the specific turbine. The term non-zero reflects that a certain vibrational movement is present. In this regard, in an embodiment, the control of the movement of the tower is conditioned upon that the determined vibrational movement of the tower is above a certain threshold level. In this regard, vibration levels below the certain threshold level is not reacted upon, but once the vibrational movement level is above the threshold level, the tower damping system produces a force that increases or decreases the vibrational movement of the tower towards the desired vibrational movement level of the tower in the horizontal plane such that the side-side and fore-aft components are substantially equal. In this regard, the tower damping system need not operate towards that the vibrational movement of the turbine is substantially equally in all directions at all times during operation, instead the tower damping system may produces a force that increases or decreases the vibrational movement of the tower to become equal over time.

The side-side component may be a lateral component of vibrational movement. The fore-aft component may be a longitudinal component of vibrational movement. The side-side component and fore-aft component may be measured relative to the yaw position, such as the yaw angle, of the nacelle, or in another manner where an absolute direction or orientation of the wind turbine is utilized, in this regard the determination of the absolute direction may take into account any yaw system offsets and correct for that. The side-side component and/or fore-aft component may be indicative of bending moments. The side-side component and/or fore-aft component may be bending moments.

The tower damping system may comprise at least one control unit. The tower damping system may comprise a blade pitch angle control unit, a speed control unit, and/or individual side-side or fore-aft tower damping control units. The tower damping system may control components of the vibrational movement of the tower by adjusting individual pitch of blades of the wind turbine, adjusting collective pitch of blades of the wind turbine, and/or by adjusting generational power and/or speed of the wind turbine.

The wind turbine may comprise a plurality of blades. The control signal may be configured to control the tower damping system to increase or decrease the side-side component by changing a collective pitch angle of the blades of the wind turbine. The control signal may be configured to control the tower damping system to increase or decrease the side-side component by changing power generation of the wind turbine. The control signal may be configured to control the tower damping system to increase or decrease the fore-aft component by changing the individual pitch angles of the blades of the wind turbine.

The method may comprise obtaining a movement signal indicative of the vibrational movement of the tower. The method may comprise determining a first signal indicative of the side-side component and a second signal indicative of the fore-aft component based on the movement signal.

Using a movement signal is beneficial as it permits vibrational movement of the tower to be monitored and for the equalization of the components to be performed in response to actual conditions. Therefore, the chance of the vibrational movement of the tower deviating from an idealized movement profile is minimised and the side-side and fore-aft components are maintained at their desired values as closely as possible.

The movement signal may comprise a signal from a strain gauge. The strain gauge may be in or on the tower of the wind turbine. The movement signal may be indicative of instantaneous vibrational movement of the tower. The movement signal may be indicative of a bending moment, hereunder the tower bottom bending moment. Alternatively the movement signal may be indicative of an acceleration measured at the tower top. The movement signal may be obtained from an accelerometer. Alternatively the movement signal may comprise a signal from a global positioning system indicating tower top position.

The method may comprise obtaining a position signal based on the movement signal, the position signal being indicative of a position of the top of the tower during the vibrational movement of the tower. The method may comprise determining the first and second signals based on the position signal.

The position signal may comprise a displacement signal. The movement signal may be an acceleration signal. The position signal may be obtained from the acceleration signal by integration. Position signals are useful indicators for approximating components of vibrational movement and/or for bending moments experienced by the tower.

The method may comprise obtaining a velocity signal based on the movement signal, the velocity signal being indicative of a velocity of the top of the tower during the vibrational movement of the tower. The method may comprise determining the first and second signals based on the position and velocity signals.

The movement signal may be an acceleration signal. The velocity signal may be obtained from the acceleration signal by integration. Velocity signals are useful indicators for approximating components of vibrational movement and/or for bending moments experienced by the tower.

Obtaining the movement signal indicative of the vibrational movement of the tower may comprise receiving a measurement signal from at least one sensor of the wind turbine. The movement signal may also be estimated based on sensor input. For example, the bottom tower bending moment may be estimated from tower top accelerometer measurements. In general, the vibrational movement signal may be measured or estimated based on various sensor signals.

The method may comprise determining a ratio based on first and second signals. The method may comprise determining first and second adjustment gains based on the ratio. The method may comprise applying the first adjustment gain to one of the first or second signals and the second adjustment gain to the other of the first or second signals. The method may comprise determining the control signal based on the gain adjusted first signal and the gain adjusted second signal.

A ratio indicates the magnitude difference between the components and can be directly utilised to generate gains to reduce the difference.

The method may comprise estimating a load distribution acting on the tower during the vibrational movement of the tower. The method may comprise determining the fore-aft component and the side-side component based on the estimated load distribution.

The load distribution may be estimated by a model-based load estimator such as a computerized load estimator. The load distribution may be estimated based on sensor values. The load distribution may be estimated based on historic, measured loading distributions.

The use of estimated load distributions permits a more flexible approach to equalizing components of the vibrational movement. The estimation may be performed elsewhere other than the wind turbine. For example, the relevant signals used for the estimation may be transmitted to a computing location where the target vibrational components are determined and transmitted back to the wind turbine controller. In addition and/or as an alternative to this, also the desired vibrational movement and/or the target vibrational components in the fore-aft and side-side directions may be calculated in a computing component not located in the wind turbine, e.g. at a remote computing location, and updated at predetermined times and the updated values are transmitted back to the wind turbine controller at the predetermined time period. This may be advantageous to keep the calculation effort down in the wind turbine.

Determining the fore-aft component and the side-side component based on the estimated load distribution may comprise determining the fore-aft component and the side-side component for each of a plurality of yaw positions of the wind turbine.

By determining the components for each of a plurality of yaw positions, the components are effectively predetermined before the wind turbine has operated at those yaw positions, and so is prepared for operation. The fore-aft and side-side components for each yaw position may be determined from the estimated load distribution.

The method may comprise determining a transform for equalising the fore-aft and side-side components, the transform being based on the components for a measured yaw position of the wind turbine, and on a measured wind speed. The method may comprise determining the control signal based on the transform.

The transform may be an algorithm. The transform may be a plurality of look-up tables. The transform may be a set of weights and/or a map of values. Implementing a transform is particularly advantageous as it can be communicated to wind turbines independently of the estimated load distribution for quick implementation.

Determining the control signal based on the transform may comprise determining a first adjustment gain and a second adjustment gain. Determining the control signal based on the transform may comprise determining a first signal indicative of the side-side component and a second signal indicative of the fore-aft component. Determining the control signal based on the transform may comprise applying the first adjustment gain to one of the first or second signals and the second adjustment gain to the other of the first or second signals.

The method may comprise identifying deviations from equalised components and generating a future transform to correct and/or balance out the deviation. As a result of using the load estimation, a deviation from the substantially equal components is permitted, and can be addressed in subsequent iterations of the transform or by updating the estimated load distribution to reflect the deviation.

The transform may be determined based on one or more of wind speed, wind direction, air density, turbulence intensity, humidity, and temperature. The transform may be determined based on one or more of blade load; blade strain; rotor speed; generator speed; power production; blade pitch angle; wind shear; pitch activity; wind wear; wave amplitude and/or direction in offshore power plants; power network noise; strength of the power network; tower position; and tower acceleration. The transform may be determined based on the oil capacity of a blade pitch system.

The control signal may be configured to produce a force that increases one of the side-side and fore-aft components to the magnitude of the other of the side-side and fore-aft components. While increasing loads may be considered to be counter-intuitive, this approach is advantageous in allowing power generation to be improved and/or for wear on components of the wind turbine such as bearings of the nacelle, rotor, or blades to be reduced.

The control signal may be configured to produce a force that decreases one of the side-side and fore-aft components to the magnitude of the other of the side-side and fore-aft components.

The control signal may be configured to produce a force that adjusts the side-side and fore-aft components to a predetermined, target magnitude.

The use of a predetermined, target magnitude may be useful in permitting multiple goals to be achieved. For example, a compromise between wear of the tower, wear of components, and power generation may be achieved by setting a target magnitude that requires an increase in one component and a decrease in the other.

The control signal may be configured to produce a force that increases or decreases the vibrational movement of the tower such that the averages of side-side and fore-aft components are substantially equal over a predetermined time period. In this regard, the desired vibrational movement and/or the target vibrational components in the fore-aft and side-side directions may be updated at predetermined times so that the averages of side-side and fore-aft components are substantially equal over the predetermined time period. In an embodiment this may be obtained by updating the target vibrational component in the side-side direction and the target vibrational component in a fore-aft direction at the predetermined time period. As an example if a determined load distribution is not substantially circular, then for the next update of the desired vibrational movement level of the tower, the target vibrational levels are set so that the load distribution will approach being circular.

The horizontal plane may be at the base of the wind turbine. By at, it is meant that the horizontal plane for which the side-side and fore-aft components are determined is positioned in a region close to the base of the wind turbine. The base of the wind turbine is typically where bending moments experienced by the tower are largest, so it is useful to adjust vibrational movements relative to the base of the wind turbine.

According to another aspect of the invention, there is provided a controller for a wind turbine control system comprising a processor and a memory module, wherein the memory module comprises a set of program code instructions which when executed by the processor implements a method described above.

According to another aspect of the invention, there is provided a wind turbine comprising a tower, a tower damping system actuable to control components of vibrational movement of the tower, and a controller described above.

According to another aspect of the invention, there is provided a computer program product downloadable from a communication network and/or stored on a machine readable medium comprising program code instructions for implementing a method described above.

Within the scope of this application it is expressly intended that the various aspects; embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described; by way of example only, with reference to the accompanying drawings, in which.

Figure 1:
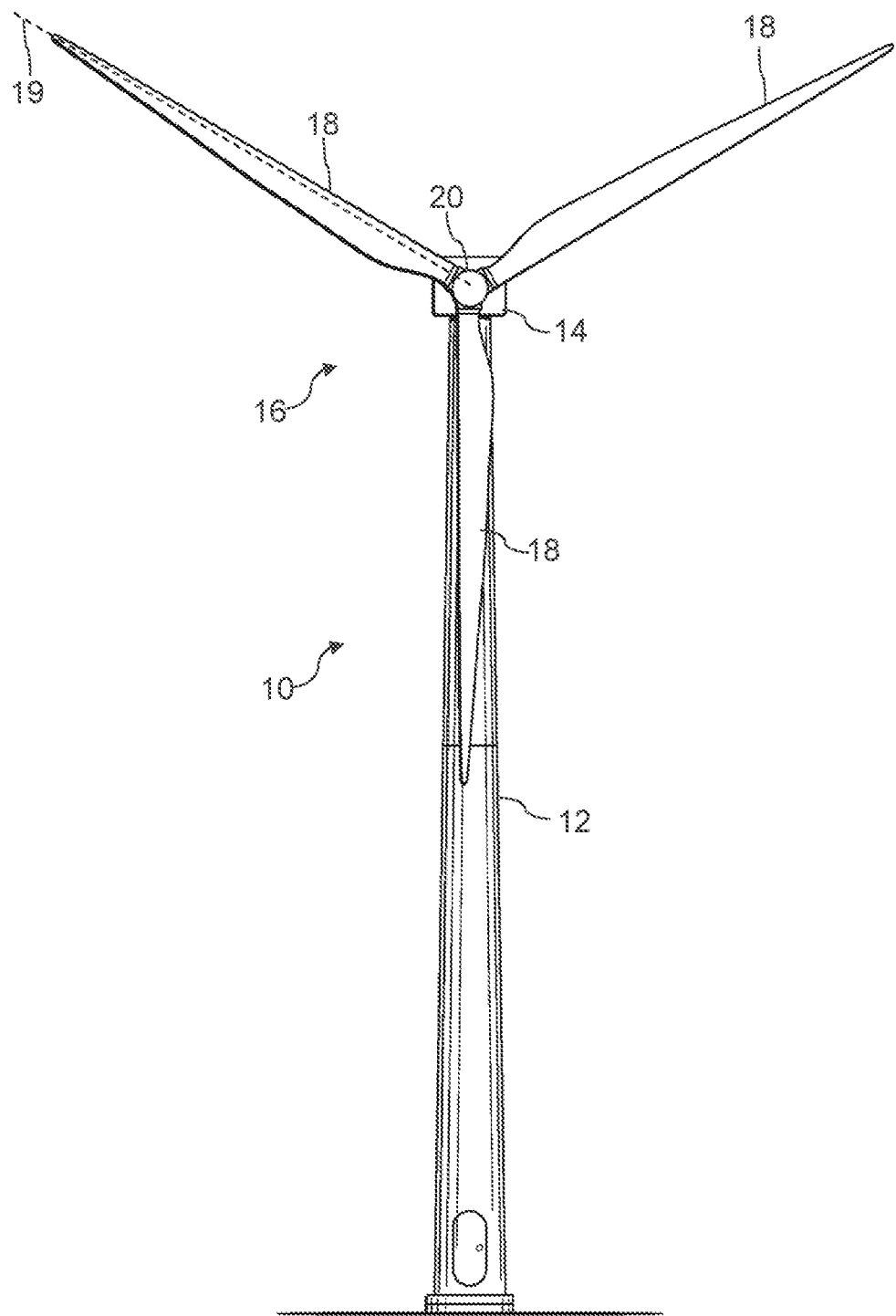
FIG. 1 is a schematic view of a wind turbine according to an embodiment of the invention.

In the drawings, like features are denoted by like reference signs.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilised and structural, logical, and electrical changes may be made without departing from the scope of the invention as defined in the appended claims.

FIG. 1 shows a wind turbine, generally designated as 10, comprising a tower 12. The tower 12 supports a nacelle 14 to which a rotor 16 is mounted. The rotor 16 is operatively coupled to a generator housed inside the nacelle 14. The rotor 16 is configured to rotate about a central axis (not shown in FIG. 1) to drive the generator to generate electrical energy. In addition to the generator, the nacelle 14 houses miscellaneous components required for converting wind energy into electrical energy, along with various other components needed to operate, control, and optimise the performance of the wind turbine 10.

The rotor 16 comprises a plurality of rotor blades 18 extending radially from a central hub 20. The blades 18 rotate in a rotor plane. In this example, the rotor 16 comprises three rotor blades 18, although it will be apparent to those skilled in the art that other configurations are possible. The rotor blades 18 are pitch-adjustable. That is to say, the pitch of the rotor blades 18 can be adjusted, about their respective longitudinal axis 19, in accordance with a collective pitch setting, where each rotor blade 18 is set to the same pitch value relating to the collective pitch setting and; or in accordance with individual pitch settings, where each rotor blade 18 may be set to its own pitch value corresponding to its individual pitch setting.

The tower 12 can experience vibrations along its length during the operation of the wind turbine 10, particularly due to the vibrational coupling between the rotor 16 and the tower 12, which can be a source of self-excitation. Vibrations of the tower 12 might also arise as a result of external forces. Self-excitation is typically caused by asymmetries or mass imbalances in the rotor 16. For example, asymmetries in the rotor 16 may come about due to geometric errors in or misalignment of the rotor blades 18, giving rise to aerodynamic asymmetries, which vary with the rotational speed of the rotor 16.

Figure 2:
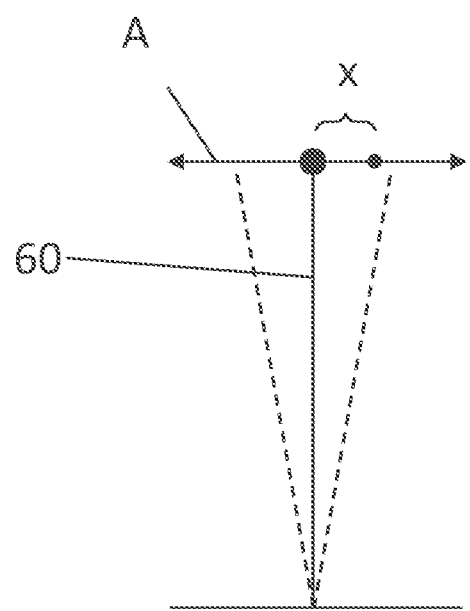
FIG. 2 is a schematic view of vibrational movement of the wind turbine in FIG. 1.

Vibrations result in bending moments along the tower 12, and particularly at the base of the tower 12 where the distance from the free mass, i.e. the nacelle 14, is greatest. Aspects of the vibration experienced by the tower 12 are schematically illustrated in FIG. 2. In this figure, the turbine 10 is illustrated by a beam structure 60, which is fixed at its lower end and provided with a mass at its free end. When the top of the beam structure 60 vibrates in a direction A, the position, x, varies between two maxima defined by the maximum deflection of the tower structure 60 during the vibration. The position, x, is representative of the position of the nacelle 14 in the direction A. The position, x, may indicate the position of the nacelle's 14 centre-of-mass, the position of a sensor housed within the nacelle 14, or the position of other fix-points representing the movement of the nacelle 14 in the direction A.

The tower 12 is considered to have at least two degrees of freedom, or vibrational modes, being able to bend laterally and longitudinally. Lateral bending is bending in a side-side direction, parallel to the plane of the rotor 16, and longitudinal bending is bending in a fore-aft direction, perpendicular to the plane of the rotor 16.

Bending in two degrees of freedom, in the fore-aft and side-side directions, can be quantified as movement or loads experienced by the tower 12, and mapped for one or more horizontal planes through the tower and positioned along the length of the tower 12. Averaged vibrational movement and/or loads along the length of the tower 12 can also be mapped. Vibration of the tower 12 in any direction can be expressed as the product of excitation in the fore-aft and the side-side directions, and so is considered to have a fore-aft component and a side-side component.

Figure 3:
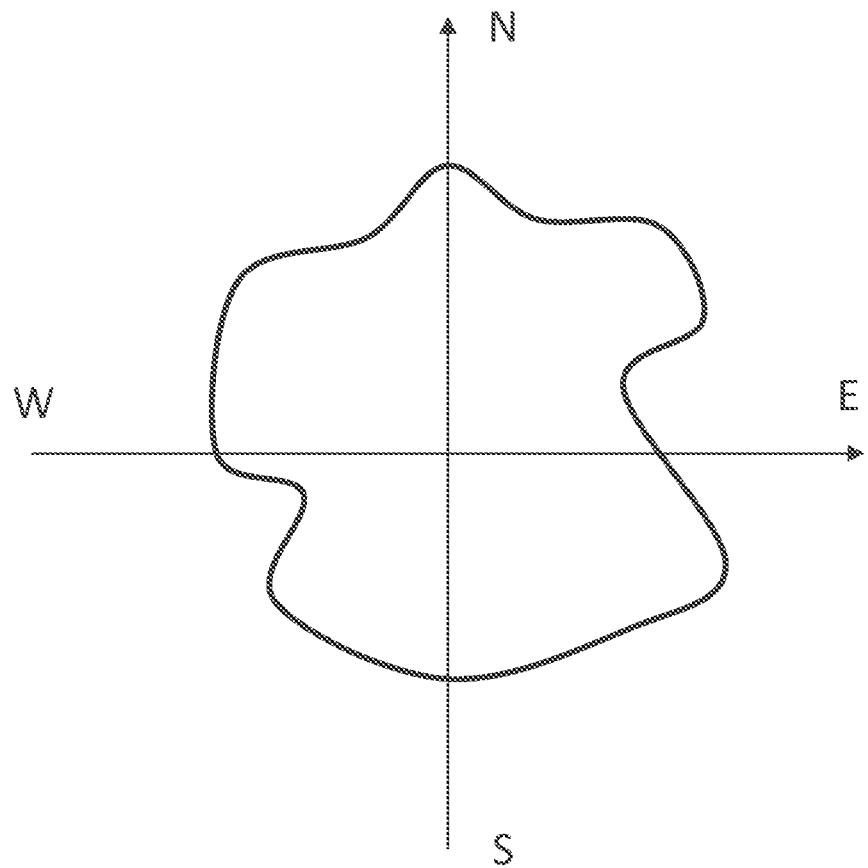
FIG. 3 is an example vibrational load map of the wind turbine in FIG. 1.

FIG. 3 illustrates an example mapping of vibrational loads experienced by the base of the tower 12 in the form of a fatigue load map charted relative to the azimuth. It will be appreciated that the example of FIG. 3 is an example only, and it will be understood that vibrational loads vary between different wind turbines and can also vary along the length of the tower 12. Load maps, such as that shown in FIG. 3, may be generated based on measurements, or may be estimated according to a model or look-up tables and based on operational parameters of the wind turbine 10.

Figure 4:
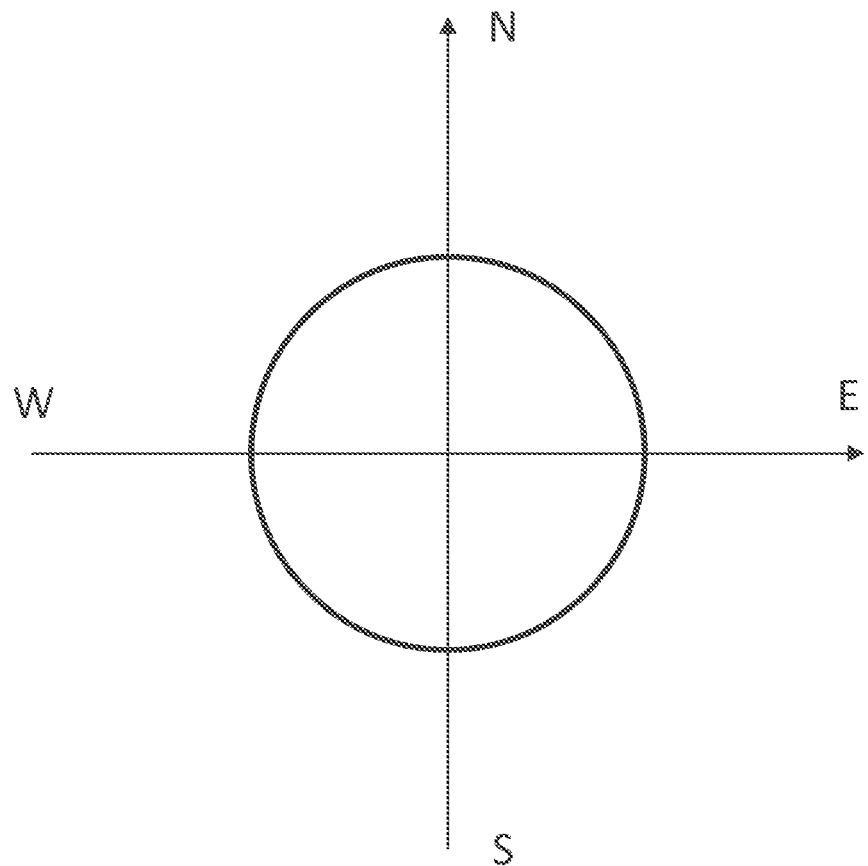
FIG. 4 is an ideal vibrational load map of the wind turbine in FIG. 1.

FIG. 4 shows an optimum load distribution in the form of a fatigue load map for the vibrational loads experienced by the tower. In FIG. 4, the load distribution is circular, meaning that the vibrational load experienced by the tower 12 is the same in all directions. Having a circular load distribution is ideal as loads in opposing directions are a balanced, and bending moments and high forces are equalized. As a result, the wearing in the tower due to fatigue caused by the bending moments is similar at all points, and no one point is worn more than the others, A circular load profile is also more robust to changes in wind direction or speed as the optimised profile remains the same regardless of the wind direction.

The load distribution of FIG. 4 may express, or form basis for, the non-zero desired vibrational movement level of the tower in a horizontal plane with a target vibrational component in a side-side direction and a target vibrational component in a fore-aft direction. In an embodiment, a desired load distribution is used as basis for setting target vibrational components in the side-side direction and fore-aft direction, in dependency upon which signal type that is used for the control signal.

In conventional wind turbine load control, it has been assumed that the vibrational loads experienced by the tower in the fore-aft direction are the dominant loads when compared with the loads in the side-side direction. Accordingly, loads in the side-side direction have been largely ignored when considering the fatigue loading of the tower 12.

However, the inventors have recognised that the vibrational loads in the side-side direction are now of a substantially similar magnitude to the loads experienced in the fore-aft direction. Therefore, side-side direction loads must be taken into account when considering fatigue loading of the tower 12.

The aim, therefore, is to alter the loading map of a turbine so that it achieves the optimum profile, or as close to the optimum profile as possible. In order to transition from the existing load mapping to an optimised load distribution, the turbine 10 incorporates control means according to an embodiment of the invention. The control means, as will now be discussed, operates to balance loading in the fore-aft and side-side directions.

Figure 5:
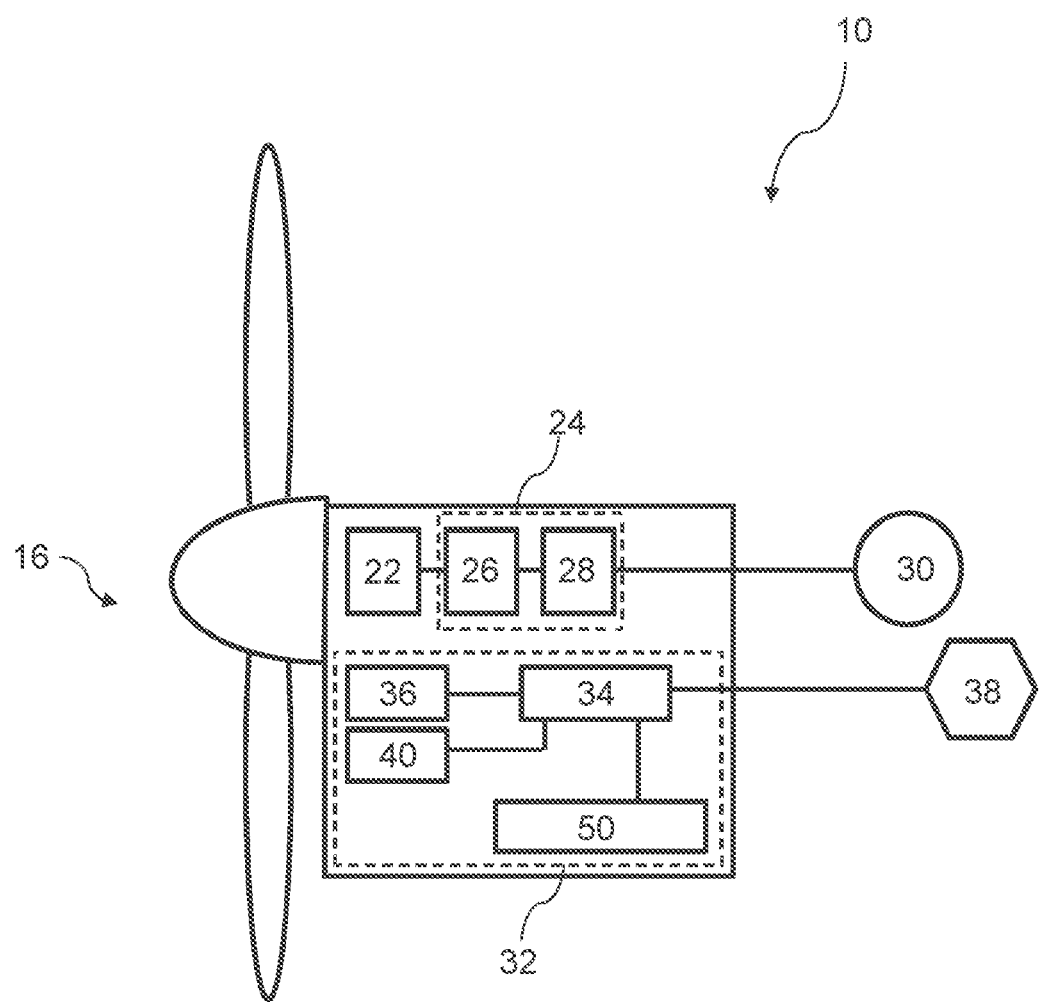
FIG. 5 is a schematic system view of the wind turbine in FIG. 1.

With reference to FIG. 5, which is a schematic illustration of the wind turbine 10 at a systems level, the wind turbine 10 comprises a control means 32 that is operable to monitor the operation of the wind turbine 10 and to issue commands thereto to achieve a set of control objectives. The control means 32 is shown in FIG. 5 as a simplified, schematic overview of a plurality of control units and modules, and also in FIG. 6, as a more detailed example of how specific units and modules may be arranged in order to facilitate data exchange between them.

The wind turbine 10 also includes a gearbox 22 and a power generation system 24 including a generator 26 and a power converter system 28. The gearbox 22 gears up the rotational speed of the rotor 16 and drives the generator 26, which in turn feeds generated power to the power converter system 28. Usually such a system will be based on three-phase electrical power, although this is not essential. Other wind turbine designs are known, such as "gearless" types, also known as "direct drive", as well as "belt drive" transmission types.

The generator 26 and the power converter system 28 may, as an example, be based on a full-scale converter (FSC) architecture or a doubly-fed induction generator (DFIG) architecture, although other architectures would be known to the skilled person.

In the illustrated embodiment, the power output of the power converter system 28 is transmitted to a load 30, which may be an electrical grid. The skilled person would be aware that different power conversion and transmission options exist.

Figure 6:
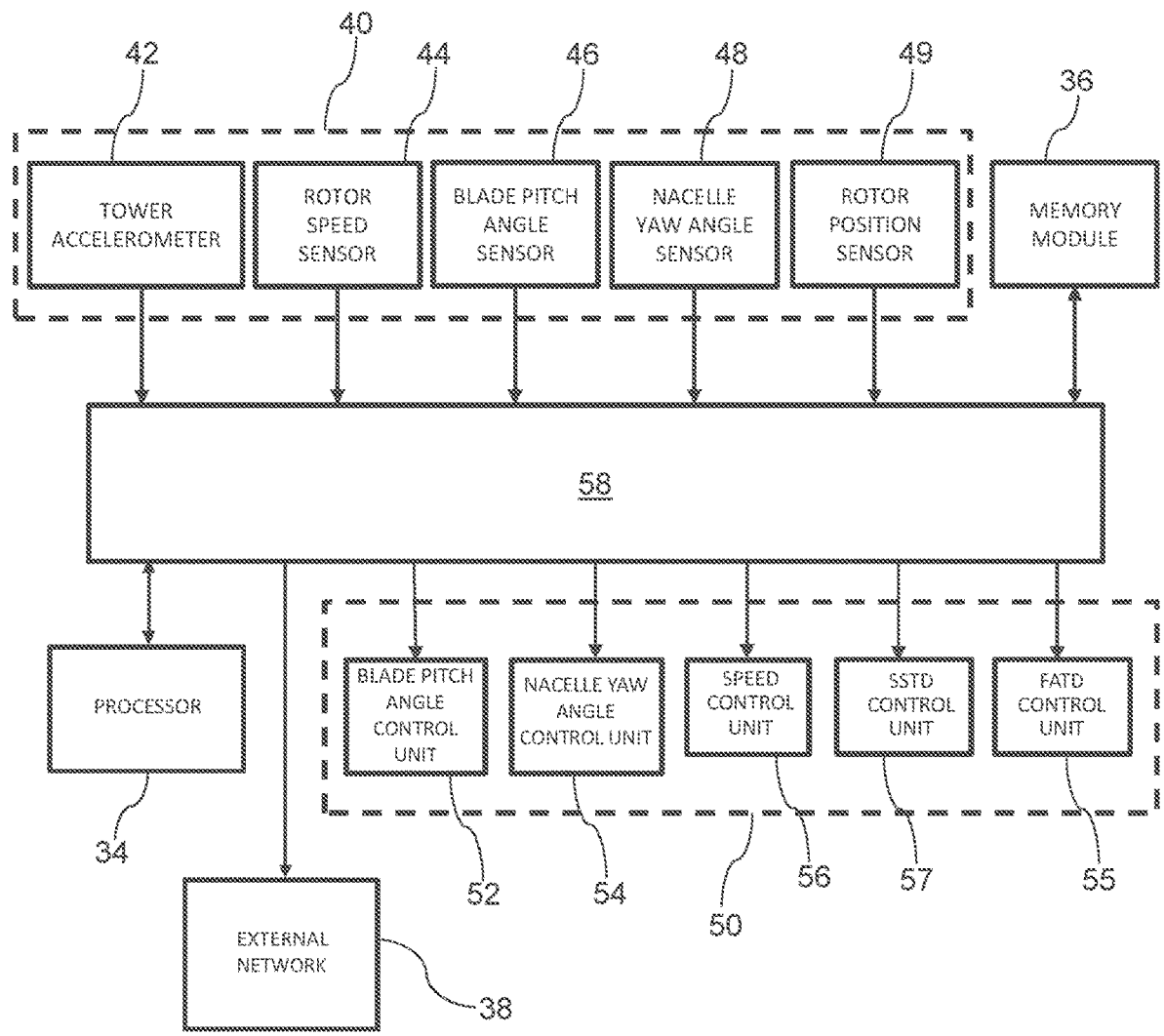
FIG. 6 is a detailed schematic system view of a monitoring and control system of the wind turbine system of FIG. 5.

Returning to the control means 32 of FIGS. 5 and 6, the control means 32 comprises a processor 34 configured to execute instructions that are stored in and read from a memory module 36 and/or an external data store that forms part of an external network 38. Measurement data may also be stored in the memory module 36, and recalled in order to execute processes according to the instructions being carried out by the processor 34.

Instructions and data may also be received from external controllers or sensors that form part of the external network 38, and recorded data and/or alerts may be issued over the external network 38 to be stored/displayed at an external source for analysis and remote monitoring.

In addition, the processor 34 is in communication with a plurality of sensors 40 that are disposed within the wind turbine 10. For example, as shown in FIG. 6, the plurality of sensors 40 may comprise a tower accelerometer 42, a rotor speed sensor 44, a blade pitch angle sensor 46, a nacelle yaw angle sensor 48 and a rotor position sensor 49. In general reference is made both to yaw angle and to yaw position. The yaw position can be expressed in different ways, hereunder as an angle. Similar aspects relate to the rotor position which is typically defined in terms of an angle in the rotor plane for each blade.

The control means 32 of the wind turbine 10 also includes at least one control unit 50.

Five control units are shown in the configuration shown in FIG. 6. These are a blade pitch angle control unit 52, a nacelle yaw angle control unit 54, a speed control unit 56 a fore-aft tower damping (FATD) control unit 55 and a side-side tower damping (SSTD) control unit 57. The blade pitch angle control unit 52 and the nacelle yaw angle control unit 54 are arranged to alter the pitch angle of the rotor blades 18 and the yaw angle of the nacelle 14, respectively, and the speed control unit 56 functions to control the rotational speed of the rotor 16 through converter control and pitch control.

The function of the FATD and SSTD control units 55, 57 is discussed in more detail below. In the embodiment shown, the blade pitch angle control unit 52 and the FATD and SSTD control units 55, 57 are separate control units. However, the skilled reader will appreciate that the respective functionalities of these separate control units 52, 55, 57 could be delivered from a single control unit or two control units.

A network 58 forms a central connection between each of the modules (according to a suitable protocol), allowing the relevant commands and data to be exchanged between each of the modules accordingly. However, it will be appreciated that suitable cabling may be provided to interconnect the units. It will also be appreciated that the wind turbine 10 could include more control units 50, and that FIG. 6 is provided only to illustrate an example of a system architecture in which the invention may be implemented.

A principal function of the control means 32 is to control power generation of the wind turbine 10 so that it optimises power production under current ambient wind conditions and in accordance with demanded power generation by a transmission grid operator. However, in addition to its main power control tasks, the control means 32 may be operable to perform a suite of monitoring functions, and carry out corrective action, if necessary. In the embodiments of the invention, one of these functions is to balance fatigue loading experienced by the tower 12 to improve its distribution. In doing so, the lifetime of the tower 12 can be extended, the power generation can be maximised, wear on particular components can be reduced, and/or new towers can be designed more cheaply because different materials can be used.

Figure 7:
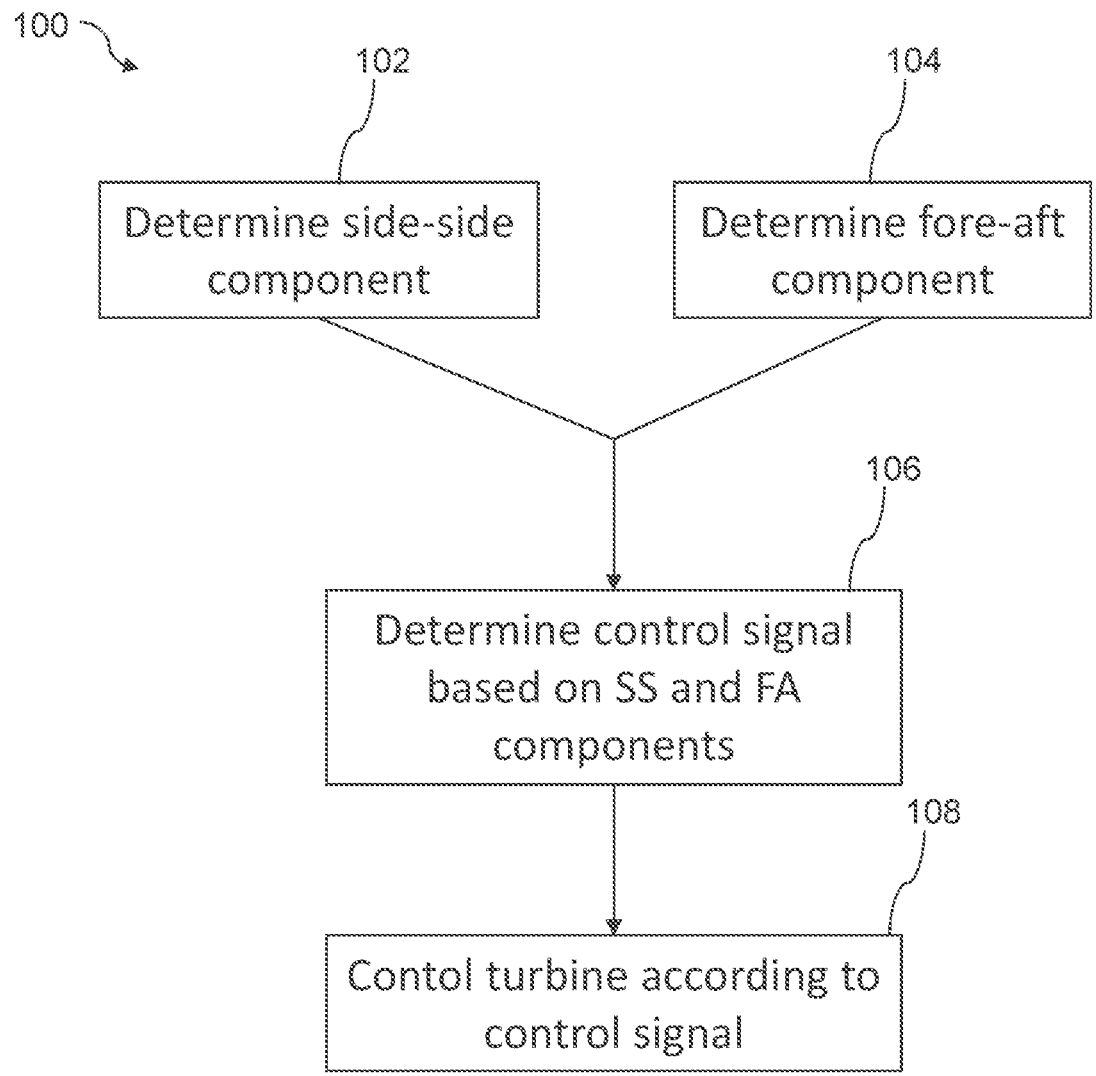
FIG. 7 is a method for controlling the wind turbine of FIG. 1 according to an embodiment of the invention.

To control the wind turbine so that loading of the tower 12 is balanced towards the optimised load distribution, the control means 32 operates according to a control protocol. A general protocol is shown by a method 100 illustrated in FIG. 7.

In this method 100, which is performed by the processor 34, a side-side component of a vibrational movement of the tower 12 in a horizontal plane is determined at step 102 and a fore-aft component of the vibrational movement of the tower 12 in the horizontal plane is determined at step 104. It is envisaged that the horizontal plane will be the horizontal plane at the base of the tower 12 or close to the base of the tower as this is where the bending moment experienced by the tower is greatest. In this example, the determinations at steps 102, 104 are shown as occurring concurrently. However, the determinations may, in some embodiments, be made sequentially.

As shown, a control signal based on the components is determined at step 106, the control signal configured to control at least one tower damping system of the wind turbine 10 so that a force is produced to increase or decrease the vibrational movement of the tower 12 such that the side-side and the fore-aft components of the vibrational movement are substantially equal. The control signal is used to control the turbine at step 108, and particularly its tower damping systems, to make the side-side and the fore-aft components of the vibrational movement of the turbine 10 substantially equal. Tower damping systems include the SSTD and FATD control units 57, 55 and other means of controlling the vibrations of the tower. For example, the blade pitch-angle control unit 52 and speed control unit 56 are tower damping systems as the blade pitch-angle and generator speed can be varied to achieve to reduce or increase vibrations of the tower. Adjusting pitch angle of individual blades is used to adjust fore-aft component of vibration and adjusting the collective pitch angle of the blades is used to adjust side-side component of vibration.

The side-side and fore-aft components may be determined 102, 104 by at least two different means. In some embodiments, the side-side and fore-aft components are determined based on measurements of parameters of the wind turbine 10 and are used to control the wind turbine 10 to iteratively alter the loads experienced by the tower 12. In other embodiments, the side-side and fore-aft components are determined based on an estimated load map. Some embodiments may make use of both estimations and measurements to determine side-side and fore-aft components.

Figure 8:
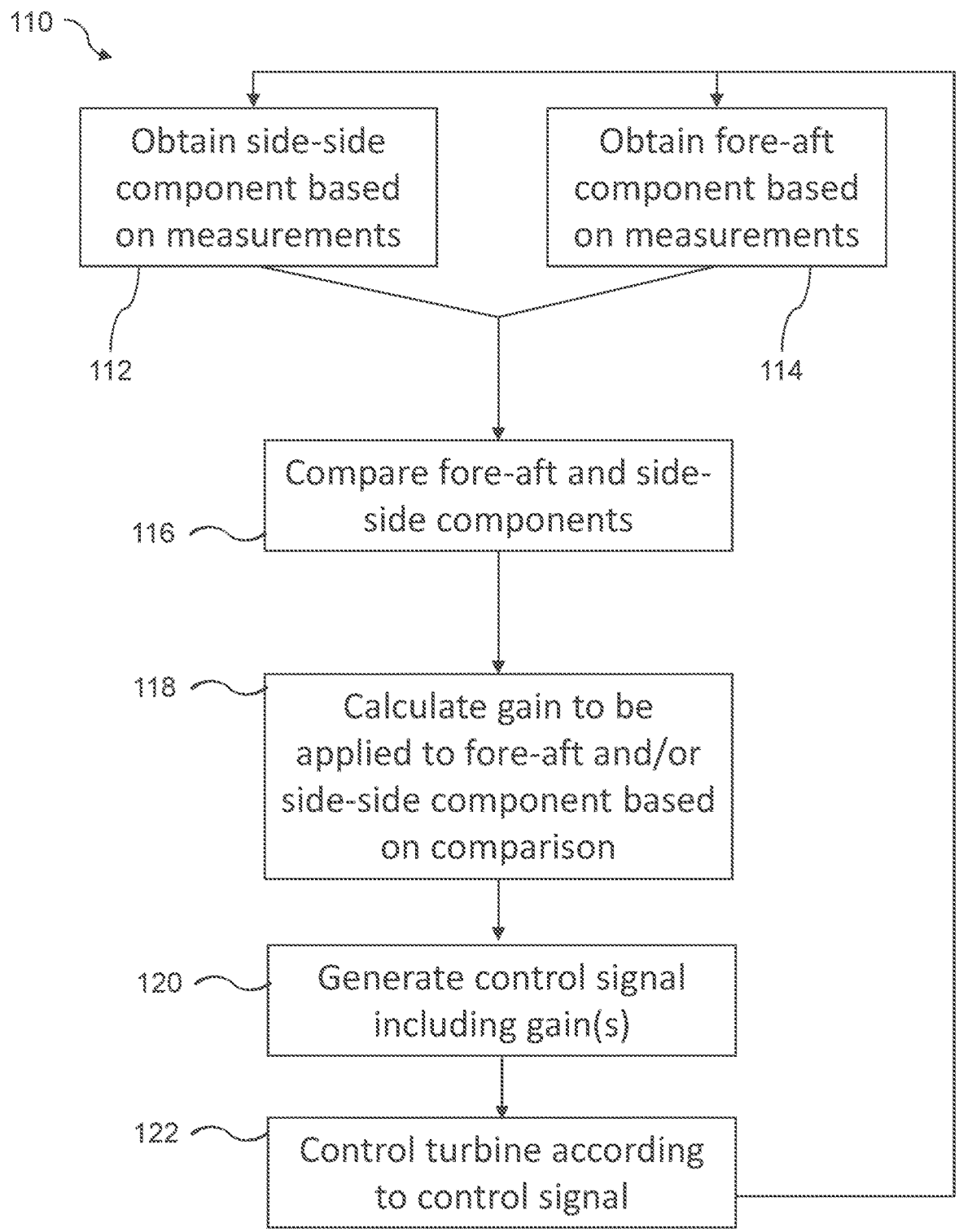
FIG. 8 is a method for controlling the wind turbine of FIG. 1 according to another embodiment of the invention; and, FIG. 9 is a method for controlling the wind turbine of FIG. 1 according to another embodiment of the invention.

FIG. 8 shows a method 110 according to a first embodiment in which measurements are used for iterative updates.

Figure 9:
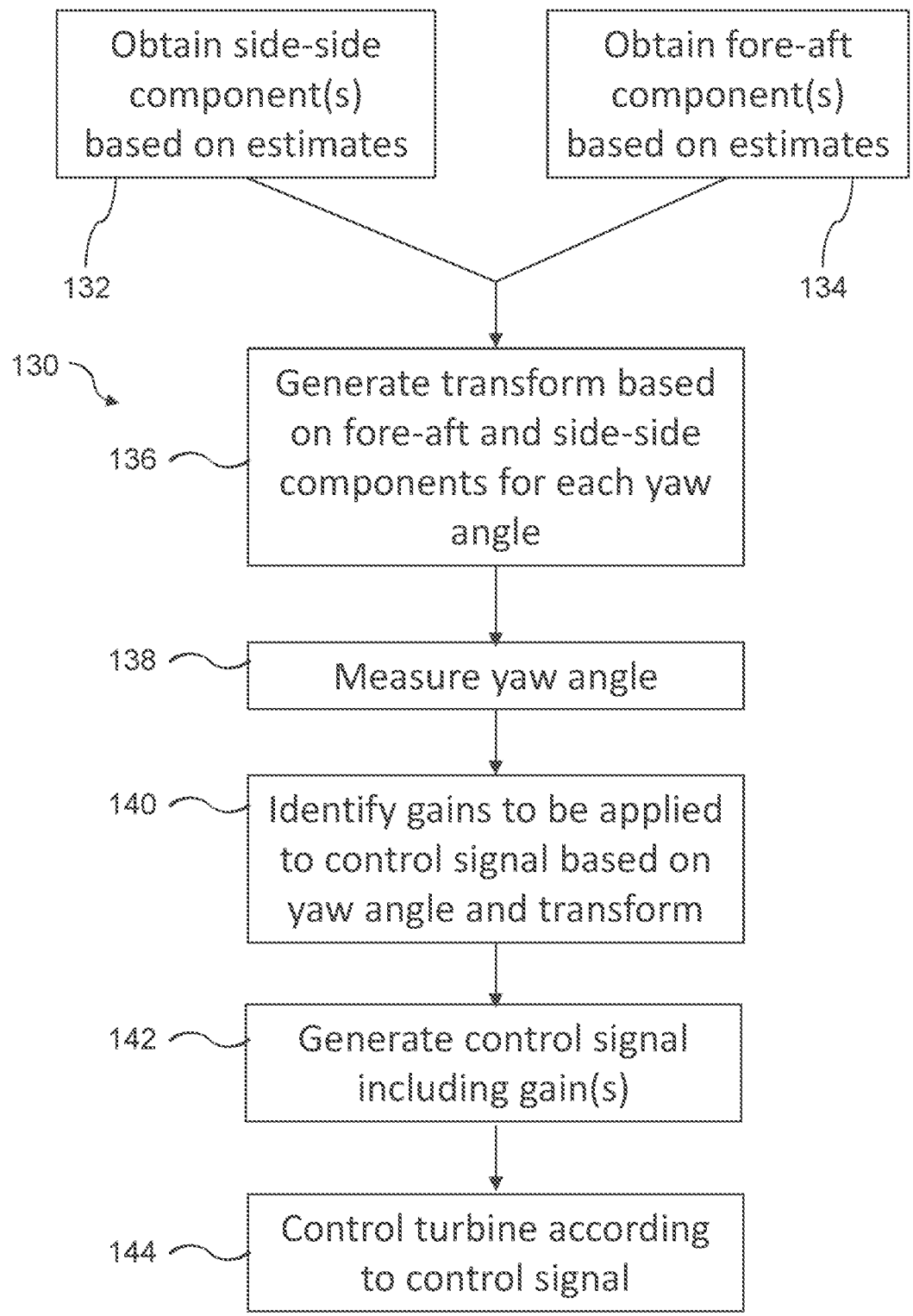

FIG. 9 shows a method 130 according to a second embodiment in which estimation is used.

In the first embodiment, shown in FIG. 8, the determination of side-side and fore-aft components of the vibrational movement of the tower 12 is based on a measurement of parameters of the wind turbine 10. It is envisaged that because this method 110 is based on instantaneous or short-term measurements, it will be performed locally within the wind turbine 10 by the control means 32, although it may alternatively or also be performed remotely by a park controller or control means shared by more than one wind turbines.

Where the side-side and fore-aft components are determined based on the measurements, the components are used to control the tower damping systems of the wind turbine 10 iteratively so that the fatigue loads experienced by the tower 12 are as substantially equal in the fore-aft and side-side directions. As will be elaborated on below, the short-term correction of tower loading ensures that the forces experienced by the tower 12 are as closely aligned with the optimum, circular loading profile of FIG. 4 as possible and that deviations from equal fore-aft and side-side loads are minimised.

In the method 110 of FIG. 8, measurements are performed, at steps 112, 114, by one or more sensors 40 of the wind turbine 10 to obtain signals indicative of the side-side and fore-aft components of the vibrational movement. Ideally, the bending moment along the length of the tower 12 would be measured as an indicator of the loads. In practice, the deflection of the tower top or nacelle 14 can also be made use of to provide an indication of the components of the loads. The deflection of the tower top or nacelle 14 is a result of the vibration of the wind turbine 10 and causes bending moments along the length of the tower 12, and so is considered a useful indicator of loading of the tower 12.

Tower top deflection is measured by obtaining a movement signal and basing the determination of the components on the movement signal. It is envisaged that the movement signal is a tower top acceleration measurement obtained from the tower top accelerometer 42, the acceleration being integrated twice with respect to time to obtain a displacement or deflection value. In other embodiments a global positioning system of the wind turbine 10 may be utilised to obtain a movement signal. An indirect detection of the movement may also be used, provided that the indirect movement correlates with the movement of the nacelle 14.

In some embodiments, the movement signal may alternatively be a measure of strain in the tower obtained from a strain gauge. The bending moment is proportional to strain, so strain is a measurement indicative of fore-aft and side-side components of vibrational movement and/or loads.

In the embodiments where tower top displacement are obtained, the fore-aft and side-side components, or at the very least the measurements indicative of them, are obtained as root-mean-square (RMS) values in the fore-aft and side-side directions respectively.

Where a rainflow-counting algorithm would ideally be used to analyse fatigue data, the RMS of change in tower top position is used instead to provide similar results. In other embodiments, the RMS of change in tower top position and the RMS value of tower top velocity are used instead to provide similar results.

Having determined and obtained signals indicative of side-side and fore-aft components at steps 112, 114, the processor 34 determines a control signal by comparing, at step 116, the signals indicative of the fore-aft and side-side components and calculates, at step 118, first and second adjustment gains, based on the comparison, to be applied to each of the signals in order to substantially equalise the components. A control signal is then generated, at step 120, based on the gain adjusted signals.

The comparison at step 116 is performed to identify the variation between the two components, or at least the signals indicative of the components, so that the first and second adjustment gains can be calculated for applying to each signal. It is envisaged that the comparison is a ratio of the signals indicative of the fore-aft component to the side-side component, although other comparisons may be used. The method 110 may be configured to apply the gains according to a desired outcome, and this configuration determines how the ratio is used to calculate the gain for each signal. Examples of desired outcomes are to reduce wear on components of the turbine 10, to increase power generation, to increase the life span of the tower 12, or a combination of one or more of these.

If the desired outcome is to reduce wear on componentry of the wind turbine 10 and/or to increase power generation, the control signal is generated 120 so that the direction having the highest loading level is preferred, and the loads experienced in the other direction are increased to match the higher loading level. In other words, if the comparison, e.g. the ratio, indicates that the signal for the fore-aft component is higher, then the gains to be applied to the components are calculated so as to increase the side-side component to the level of the fore-aft component. If the side-side component is higher, the gains to be applied are calculated to increase the fore-aft component to the level of the side-side component. In this embodiment, a unity gain or no gain is applied to the higher component. While the overall loads have been increased, the reduction in the difference between the loads in the fore-aft and side-side directions leads to an improvement of the wear on components of the turbine 10 such as hub 20, rotor 16, and blade 18 bearings.

By increased power generation, it is meant that constraints on power generation implemented to reduce side-side components of vibrational movement are minimised because the allowable loads are higher. As a result, power generation is improved.

If the desired outcome is to increase the life span of the tower 12, the control signal is generated 120 so that the higher component is reduced towards the level of the lower of the two components. So, for example, if the fore-aft component is higher than the side-side component, the gain is generated to reduce the level of the fore-aft component to the level of the side-side component and vice versa. A unity gain or no gain is applied to the component having the lower level. By reducing loads to be substantially equal, the tower life span is increased because the loads are expected to be substantially equal on all parts of the tower 12. In turn, because loads are reduced, reinforcement of the tower can also be reduced in new turbines, resulting in less material being used and a cheaper turbine.

In other embodiments, the control signal is calculated to adjust both components to maintain a target loading level. In these embodiments, the desired outcome may be a combination of the three outcomes above.

The control signal is generated 120 by the processor 34 for communication via the network 58 to one or more of the control units 50 to control the wind turbine 10 to implement the increase or decrease in fore-aft and side-side components. Although not shown in FIG. 8, the control units 50 generate actuator signals to communicate to the relevant actuators to control 122 the wind turbine 10.

Loading is altered in the side-side direction by adjusting the individual pitch of each blade 18 of the turbine 10 using the blade-pitch angle control unit 52, or by adjusting the power generation of the turbine using the speed control unit 56. In some embodiments, the pitch and/or the power generation may be adjusted directly by the SSTD control unit 57. In some embodiments, the SSTD control unit 57 may receive the control signal and may control the blade-pitch angle control unit 52 and/or the speed control unit 56 to perform the relevant alteration or actuation. Other control units may be used as would be understood by the skilled person.

Loading is altered in the fore-aft direction by adjusting the collective pitch of the blades 18 of the turbine 10 using the blade-pitch angle control unit 52. In some embodiments, the collective pitch may be controlled directly by the FATD control unit 55. In some embodiments, the FATD control unit 55 may receive the control signal and may control the blade-pitch angle control unit 52 to perform the relevant actuations.

In other words, the SSTD and FATD control units 57, 55 may indirectly or directly control the wind turbine according to the control signal. Model predictive control (MPC) may also or alternatively be used to alter fore-aft and side-side components according to control signals.

Having altered the loads according to the control signals, the fore-aft and side-side components are obtained 112, 114 by measurement again to iteratively adjust the fore-aft and side-side components in reaction to the gains applied in the previous iteration. It is envisaged that the method is repeated after a short period of time. For example, the method may be repeated up to one hour after the control signal was applied. In some examples, the method may be performed every 10 minutes.

By applying short-term alterations in the manner described above, the fore-aft and side-side components of the vibrational movement or loads of the tower are maintained at substantially equal levels or magnitudes. Over several iterations and/or when performed for several different wind directions, the vibrational loads experienced by the tower bottom are expected to resemble the load map of FIG. 4.

In the second embodiment, shown in FIG. 9, the determination of side-side and fore-aft components of the vibrational movement of the tower is based on estimated values. Utilising estimates enables a longer-term control protocol, where asymmetries in the fore-aft and side-side components are corrected over a longer period of time by adjusting the estimated components on which the control is based. Implementing changes in fore-aft and side-side components over a long period of time permits a slow rate of change of components so control of the turbine does not result in high, potentially harmful loads being exerted. It is envisaged that some of this embodiment method will be performed remotely by a park controller or control means shared by more than one turbine, while some of this embodiment will be performed locally, as will be explained.

In the method 130 of FIG. 9, the fore-aft and side-side components are determined, at steps 132, 134, based on estimated load values or an estimated load distribution using a computerized load estimator. A computerized load estimator is a model-based load estimator, which, based on actual measured sensor values, determines or estimates load exposure of the turbine. The load estimator may be based on trained black-box models, such as surrogate models or neural networks to map measured sensor values into load estimates, such as fatigue exposure or other wear measures of selected components, hereunder the tower. In embodiments, the load estimator may provide a load distribution of experienced wear over a specified working time of the turbine. In an embodiment, the computerized load estimator may be operated to provide a fatigue load map charted relative to the azimuth, as in FIG. 3, and based on the fatigue load map determine control signals for controlling the tower damping system of the wind turbine in order to reach a fatigue load map as that of FIG. 4. This may be repeated during continued operation of the turbine in order to, based on the computerized load estimator, seek towards the fatigue load map as that of FIG. 4.

Generally, the fore-aft and side-side components are determined for each of a plurality of yaw positions of the turbine. From a set of load values that could be mapped to form a load map such as that shown in FIG. 3, a centralised, remote park controller identifies the plurality of yaw angles and, for each yaw angle, obtains a fore-aft and side-side component from the load values. As an alternative, the yaw angles may be performed first, and a model used to determine the components.

Having obtained the fore-aft and side-side components, a transform is generated, at step 136, based on the obtained components calculated for each of the yaw angles. The transform is for use locally by the control means 32 to calculate the gain to be applied in each of the fore-aft and side-side directions so as to achieve a substantially equal or equalised load in those directions over a predetermined period of time. The gains may be calculated to increase the lower component to the magnitude or level of the higher component, to reduce the higher component to the magnitude of the lower component, or to attain the same target magnitude for each of the components according to a predetermined target magnitude.

The transform may also be based on wind speed. The transform may be based on other parameters measured by sensors of the wind turbine 10, or measured by remote sensors associated with a wind park to which the turbine 10 belongs, including: wind direction; air density; turbulence intensity; humidity; temperature; blade load; blade strain; rotor speed; generator speed; power production; blade pitch angle; wind shear; pitch activity; wind wear; wave amplitude and/or direction in offshore power plants; power network noise; strength of the power network; tower position; and tower acceleration. The capabilities of components of the turbine 10, for example the oil capacity of the pitch system, may also be used in the transform to limit the gains applied.

While a transform is described here; in other embodiments a formula, look-up tables, a load map, or other data retrieval or estimation methods may be utilised instead. The transform or its replacement is implemented to permit the control means 32 of the wind turbine 10 to identify the gain levels to be applied to fore-aft and side-side direction control signals to result in the correct and desired loading map, so the transform may be described generally as a gain calculation means. So, the remote park controller generates a gain calculation means for distribution to processors 34 of individual or groups of wind turbines via the external network 38.

The processor 34 measures yaw angle, at step 138, and any other parameter required to enable calculation of the gain to be applied. The yaw angle is used by the processor 34 in the transform or gain calculation means to identify 140 the correct gain to be applied in each of the fore-aft and side-side directions, at step 140; and to generate a control signal based on these gains; at step 142. The turbine and its damping systems are then controlled according to the control signal, at step 144, as described above in relation to FIG. 8.

Although not shown in FIG. 9, the loads experienced by the tower 12 operating using the transform are monitored over time. The loads are then used to generate a new estimated load map and/or transform to control the wind turbine for another period of time. If, over the first period of time, an asymmetry in the loads is experienced then the transform generated in the next iteration is adjusted to balance out the asymmetry. This may also be performed over a series of transforms and iterations. It is envisaged that one transform may be generated and used by the wind turbine for one day or more. In some cases, one transform may be used for more than a week, or in some circumstances, more than one month.

The method of FIG. 9 can therefore make use of machine learning to carefully alter what is supplied to wind turbines for controlling loads so that the overall loading over an extended period of time is consistent and conforms to the profile of FIG. 4. The updates to the transform may be performed offline.

In some embodiments, the methods of FIGS. 8 and 9 may be combined to form a hybrid method. In some embodiments of such a method, an iterative feedback system refines the transform to achieve the optimal loading distribution based on measurements obtained from sensors of the wind turbine control system. In other embodiments, measurements may be used to iteratively update the model according to which the transform is generated by a separate feedback system.

It will be appreciated by those skilled in the art that the invention has been described by way of example only, and that a variety of alternative approaches may be adopted without departing from the scope of the invention, as defined by the appended claims.

The invention claimed is:

1. A method of controlling a wind turbine, the method comprising:
determining a non-zero desired vibrational movement level of a tower in a horizontal plane with a target vibrational component in a side-side direction and a target vibrational component in a fore-aft direction, where the target vibrational component in the side-side direction and the target vibrational component in the side-side direction are substantially equal;
determining a side-side component of a vibrational movement of the tower in a horizontal plane;
determining a fore-aft component of the vibrational movement of the tower in the horizontal plane; and
adjusting a pitch angle, a yaw angle, a rotor speed, or a power generation of the wind turbine based on the side-side component, the fore-aft component, the target vibrational component in the side-side direction, and the target vibrational component in the fore-aft direction such that the vibrational movement of the tower is adjusted towards the non-zero desired vibrational movement level of the tower in the horizontal plane.

2. The method of claim 1, further comprising:
obtaining a movement signal indicative of the vibrational movement of the tower; and,
determining a first signal indicative of the side-side component and a second signal indicative of the fore-aft component based on the movement signal.

3. The method of claim 2, further comprising:
obtaining a position signal based on the movement signal, the position signal being indicative of a position of the top of the tower during the vibrational movement of the tower; and
determining the first and second signals based on the position signal.

4. The method of claim 3, further comprising:
obtaining a velocity signal based on the movement signal, the velocity signal being indicative of a velocity of the top of the tower during the vibrational movement of the tower; and
determining the first and second signals based on the position and velocity signals.

5. The method of claim 2, wherein obtaining the movement signal indicative of the vibrational movement of the tower comprises receiving a measurement signal from at least one sensor of the wind turbine.

6. The method of claim 2, further comprising:
determining a ratio based on first and second signals;
determining first and second adjustment gains based on the ratio;
applying the first adjustment gain to one of the first or second signals and the second adjustment gain to the other of the first or second signals; and
determining a control signal based on the gain adjusted first signal and the gain adjusted second signal.

7. The method of claim 1, further comprising:
estimating a load distribution acting on the tower during the vibrational movement of the tower; and
determining the fore-aft component and the side-side component based on the estimated load distribution.

8. The method of claim 7, wherein determining the fore-aft component and the side-side component based on the estimated load distribution comprises:
determining the fore-aft component and the side-side component for each of a plurality of yaw positions of the wind turbine.

9. The method of claim 8, further comprising:
determining a transform for equalising the fore-aft and side-side components, the transform being based on the components for a measured yaw position of the wind turbine, and on a measured wind speed; and
determining a control signal based on the transform.

10. The method of claim 9, wherein determining the control signal based on the transform comprises determining a first adjustment gain and a second adjustment gain, determining a first signal indicative of the side-side component and a second signal indicative of the fore-aft component, and applying the first adjustment gain to one of the first or second signals and the second adjustment gain to the other of the first or second signals.

11. The method of claim 9, wherein the transform is determined based on one or more of wind speed, wind direction, air density, turbulence intensity, humidity, and temperature.

12. The method of claim 1, wherein a control signal is configured to produce a force that increases one of the side-side and fore-aft components to a magnitude of the other of the side-side and fore-aft components, or wherein the control signal is configured to produce a force that decreases one of the side-side and fore-aft components to a magnitude of the other of the side-side and fore-aft components.

13. The method of claim 1, wherein a control signal is configured to produce a force that increases or decreases the vibrational movement of the tower such that averages of the side-side and fore-aft components are substantially equal over a predetermined time period.

14. The method of claim 13, wherein the desired vibrational movement and/or the target vibrational component in the side-side direction and the target vibrational component in a fore-aft direction are updated at the predetermined time period.

15. The method of claim 1, wherein the desired vibrational movement and/or the target vibrational components in the fore-aft and side-side directions are calculated in a remote computing component not located in the wind turbine and transmitted to a wind turbine controller.

16. A non-transitory computer readable medium comprising program code instructions for implementing an operation of controlling a wind turbine, the operation comprising:
  determining a non-zero desired vibrational movement level of a tower in a horizontal plane with a target vibrational component in a side-side direction and a target vibrational component in a fore-aft direction, where the target vibrational component in the side-side direction and the target vibrational component in the side-side direction are substantially equal;
  determining a side-side component of a vibrational movement of the tower in a horizontal plane;
  determining a fore-aft component of the vibrational movement of the tower in the horizontal plane; and
  adjusting a pitch angle, a yaw angle, a rotor speed, or a power generation of the wind turbine based on the side-side component, the fore-aft component, the target vibrational component in the side-side direction, and the target vibrational component in the fore-aft direction such that the vibrational movement of the tower is adjusted towards the non-zero desired vibrational movement level of the tower in the horizontal plane.

17. A controller for a wind turbine system, comprising:
  a processor;
  a memory module communicatively coupled to the processor; wherein the memory module comprises a set of program code instructions which, when executed by the processor, perform an operation of controlling a wind turbine, the operation comprising:
    determining a non-zero desired vibrational movement level of a tower in a horizontal plane with a target vibrational component in a side-side direction and a target vibrational component in a fore-aft direction, where the target vibrational component in the side-side direction and the target vibrational component in the side-side direction are substantially equal;
    determining a side-side component of a vibrational movement of the tower in a horizontal plane;
    determining a fore-aft component of the vibrational movement of the tower in the horizontal plane; and
    adjusting a pitch angle, a yaw angle, a rotor speed, or a power generation of the wind turbine based on the side-side component, the fore-aft component, the target vibrational component in the side-side direction, direction and the target vibrational component in the fore-aft direction such that the vibrational movement of the tower is adjusted towards the non-zero desired vibrational movement level of the tower in the horizontal plane.

18. A wind turbine, comprising:
  a tower; and
  a controller configured to perform an operation, comprising:
    determining a non-zero desired vibrational movement level of the tower in a horizontal plane with a target vibrational component in a side-side direction and a target vibrational component in a fore-aft direction, where the target vibrational component in the side-side direction and the target vibrational component in the side-side direction are substantially equal;
    determining a side-side component of a vibrational movement of the tower in a horizontal plane;
    determining a fore-aft component of the vibrational movement of the tower in the horizontal plane; and
    adjusting a pitch angle, a yaw angle, a rotor speed, or a power generation of the wind turbine based on the side-side component, the fore-aft component, the target vibrational component in the side-side direction, and the target vibrational component in the fore-aft direction such that the vibrational movement of the tower is adjusted towards the non-zero desired vibrational movement level of the tower in the horizontal plane.

* * * * *